(No Model.) 2 Sheets—Sheet 2.

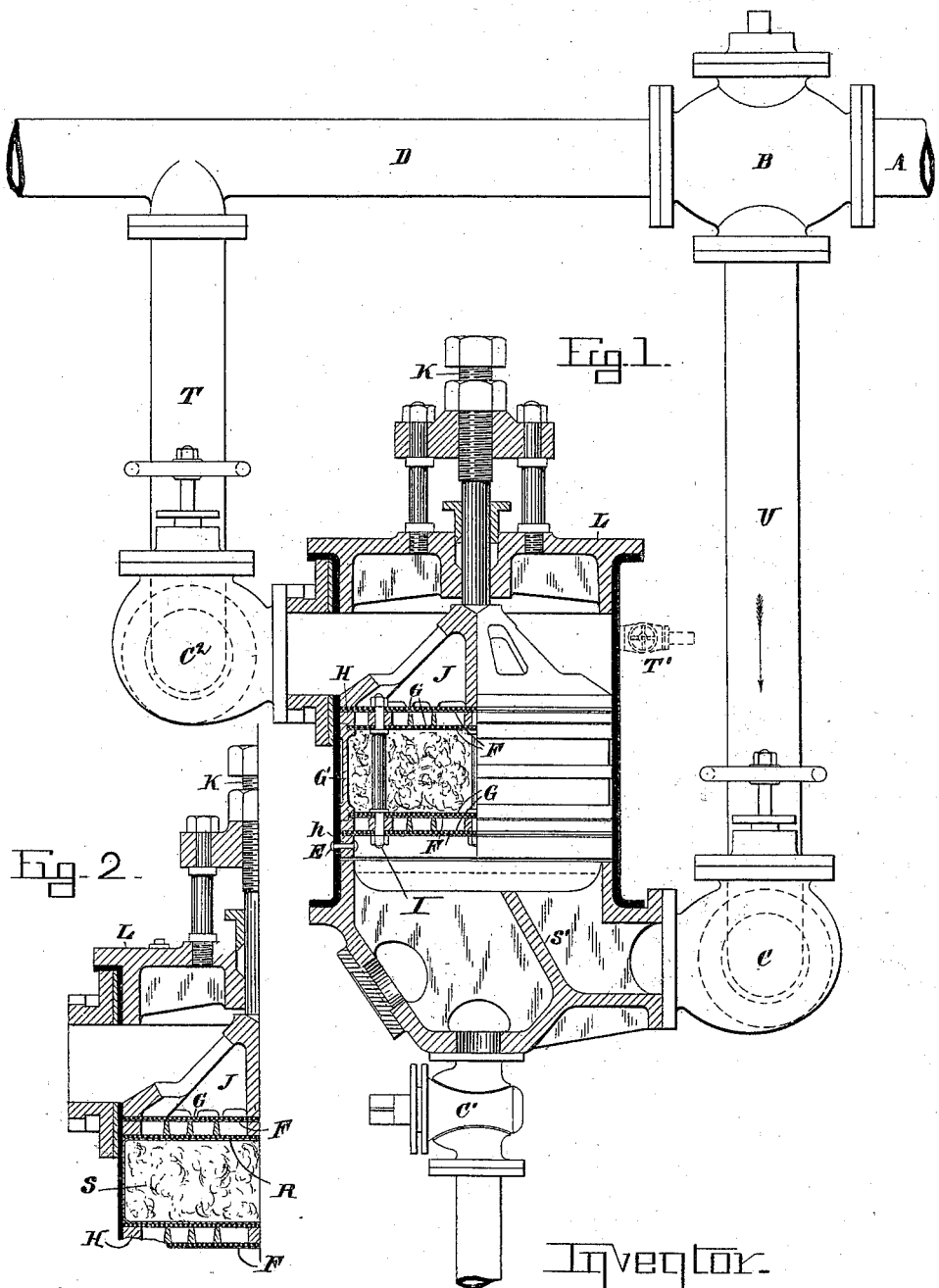

A. HARRIS.
FEED WATER FILTER.

No. 556,008. Patented Mar. 10, 1896.

Witnesses
Arthur Ashley
Horace A. Dodge

Inventor
Anthony Harris,
by Dodge Sons,
Attys

UNITED STATES PATENT OFFICE.

ANTHONY HARRIS, OF MIDDLESBOROUGH, ENGLAND.

FEED-WATER FILTER.

SPECIFICATION forming part of Letters Patent No. 556,008, dated March 10, 1896.

Application filed May 16, 1893. Serial No. 474,386. (No model.) Patented in England April 20, 1891, No. 6,801.

*To all whom it may concern:*

Be it known that I, ANTHONY HARRIS, engineer, a subject of the Queen of Great Britain, residing at Middlesborough, in the county of York, England, have invented certain new and useful Improvements in Feed-Water Filters, (for which I have received Letters Patent in Great Britain, No. 6,801, dated April 20, 1891,) of which the following is a specification.

This invention has for its object a filter applicable for filtering or purifying the feed-water of steam-boilers and for other purposes.

The invention is best described by aid of the accompanying drawings, in which—

Figure 3:
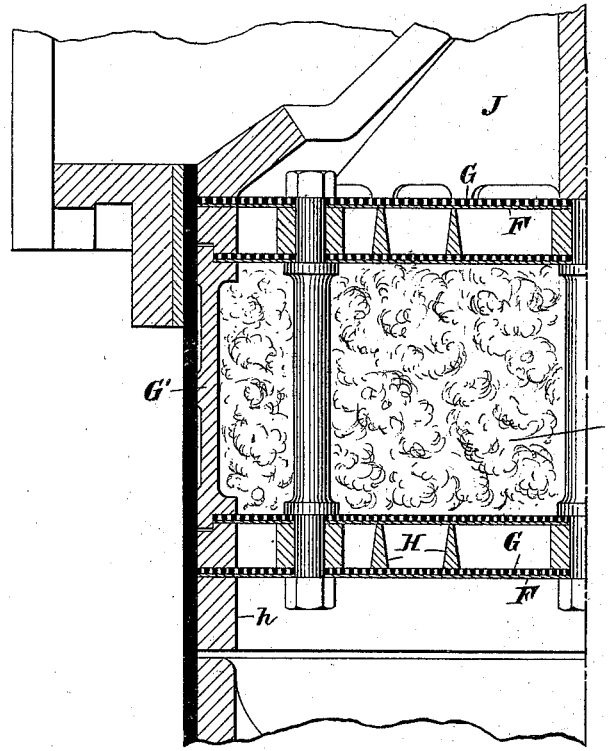
Figures 4, 5:
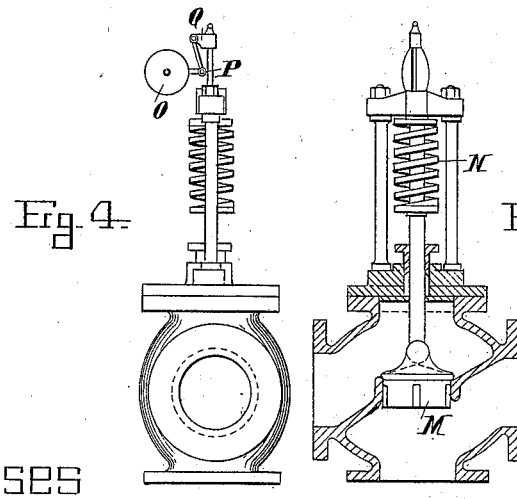

Figure 1 is an elevation, partly in section, of the filtering apparatus as a whole; Fig. 2, a vertical section of a portion of my filter, showing a slightly-modified arrangement; Fig. 3, enlarged view of part of Fig. 1; Figs. 4 and 5, side elevation and section of valve B.

In the drawings, A is a feed-pipe bringing the water from the pump to the boiler or from the hot well to the feed-pumps. In the latter case the water would be sucked through the filter, but the valve would work exactly the same and open direct communication if the vacuum behind the pump rose about the required pressure.

B is a valve weighted or screwed down to open at any given pressure, so that if the resistance of the filter becomes more than said given pressure the valve B opens and allows the water to pass through pipe D to the boiler or feed-pump.

C, C' and C² are stop-valves; T, pipe leading from valve C² to pipe D and pipe U leading from pipe A beneath valve B to valve C; E, a ring riveted to shell and on which the filter rests; F F F F, four layers of flannel having immediately above them perforated plates G G G G. Between the two sets or pairs of plates G are brass gratings H H to support and relieve the pressure on the perforated plates G and to keep them at the right distances from each other, and by pressing the inner flannels between the plates G G and the internal shell of the filter to prevent the filtering medium escaping.

I I are screws to keep the plates and internal shell G' tight.

Between the two inner plates G G is a layer S of spongy iron. On the top of the upper plate a perforated bell J is pressed down by means of screw K, holding all tight, especially the two flannel joints, where the lower grate and perforated plate rest on the supporting-ledge *h*. L is a cover for the filter.

Referring to Figs. 4 and 5, showing two views of valve B, M is the valve; N, a spring holding it down; O, a gong; P, a clapper, and Q a collar on the shaft linked to the clapper of the gong.

The mode of action of the entire apparatus is as follows: The water being pumped through A passes through the valve-chamber of B down the vertical pipe to the filter as long as the resistance of the filter is less than the pressure to which the valve B is weighted. The moment, however, that that pressure is momentarily exceeded the valve M rises, carrying collar Q with it, and by this means rings the gong. The pulsations of pumping, causing the pressure to be alternately above and below the resistance of the filter, cause the spindle of the valve for a time to dance up and down, incessantly ringing the gong. The attendant hearing this ringing at once closes valve C and opens valve C'. The water then, after lifting valve B, rushes into the filter through valve C², cleaning out the dirt which runs off through the valve C'. The cleansing can be done, if desired, by means of a pipe and valve, such as T, specially provided and connected to the boiler for this purpose. The valve C' is again closed, the valve C opened, and the apparatus continues as before. When, however, in course of time, the filter gets so corrupt as to require renewing or altering, the valves C and C² are closed, the lid L and the bell J of the filter removed, and the filter withdrawn bodily from its case. A spare filter, consisting of the parts connected together by the studs I, can then be put in its place and the bell J and lid L fixed on as before. The old filter can now be carefully cleaned or replenished at leisure. It will be seen, consequently, that although there may be two hundred pounds pressure to the square inch in the boiler there is never any more pressure through the filter while in actual work than what the valve B is weighted for. When, however, the filter is to be cleaned out, the valve $C^2$ can be opened or throttled to any desired extent, and thus any desired pressure put on the filter. The result is that until the filter is nearly worn out it is found to be perfectly self-cleaning.

I prefer spongy iron for the filtering material to charcoal or other like ingredients, as not merely does it act as a filter and deodorizing material, but it also acts instead of zinc in separating copper from the feed-water and thus increases the longevity of the boiler.

Instead of the spindle of valve B directly actuating the gong, when more convenient I attach to the spindle a circuit making and breaking device, so as to ring an electric bell near where the attendant is stationed.

In a slightly-modified form of my filter I dispense with the inner metal chamber of filter, Fig. 1, and confine the spongy iron or filtering material in a flannel bag R, Fig. 2, placed between the two inner perforated plates G, retaining the grates and flannels as before. In this case I exert pressure direct on the flannel bag R by screwing down the perforated bell J onto the upper grate by means of a screw-spindle K. In this arrangement I have the advantage of being able, when required, to relieve the pressure of the bag R of filtering material when the particles get set too closely together without allowing them to escape while the filter is working.

The division-plate S′ in front of the valve C, Fig. 1, directs the flow of water across the surface of the lower filtering-flannel and tends to detach any particles of dirt adhering to it, and deposits them at the opposite side of division-plate in close proximity to the sludge-valve C′ ready for removal.

To facilitate the deposition of copper as the feed water passes through the filter, I sometimes pass an electric current through the water by means of insulated wires connected to any suitable dynamo or battery.

I declare that what I claim is—

1. In combination with a pipe A D adapted to deliver water from the pump to the boiler; a branch U T from said pipe; a filter in said branch; and an automatic valve B placed in the water-supply pipe between the pump and boiler, and weighted to the required resistance; whereby, when the resistance in the filter equals or exceeds the pressure to which the valve is adjusted, the filter is thrown out of action, the current reversed, and the water allowed to proceed direct to the boiler.

2. In combination with a filter for filtering feed-water, of the inlet-pipe A, the valve B connected thereto, pipe U between said valve and the filter, pipe D also communicating with valve B, pipe T connected to the filter and also in communication with pipe D, and valves $c$ $c'$ and $c^2$ located as shown and described, whereby when the resistance becomes too heavy the filter is thrown out of action.

In testimony whereof I have signed my name to this specification in the presence of two subscribing witnesses.

ANTHONY HARRIS.

Witnesses:
  G. C. DYMOND,
  H. P. SHOOBRIDGE.